May 2, 1939. M. M. COLLINS 2,156,751
EMERGENCY AUTOMOBILE HORN SOUNDER
Filed Sept. 6, 1934
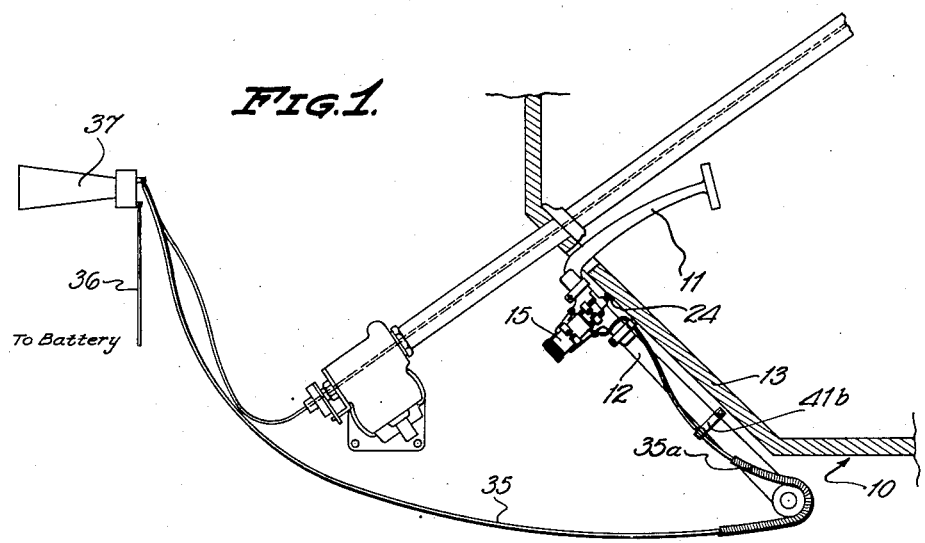
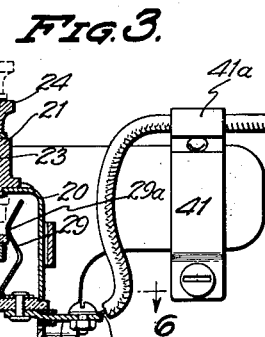
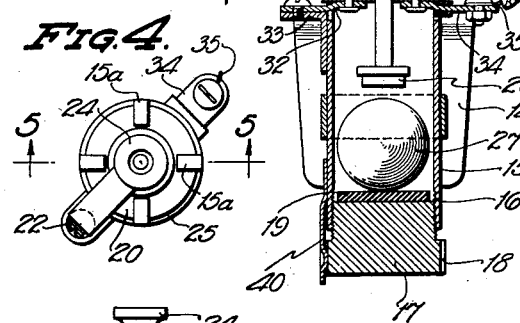
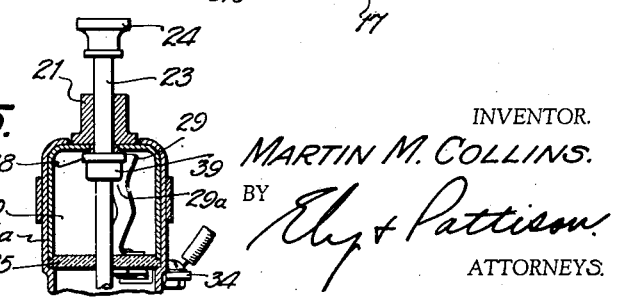
INVENTOR.
MARTIN M. COLLINS.
BY
ATTORNEYS.
WITNESS:

Patented May 2, 1939

2,156,751

UNITED STATES PATENT OFFICE 2,156,751

EMERGENCY AUTOMOBILE HORN SOUNDER

Martin M. Collins, Danbury, Conn.

Application September 6, 1934, Serial No. 742,877

7 Claims. (Cl. 200—52)

This invention relates to an emergency automobile horn sounder for automatically signalling upon the quick initial brake actuating movement of the foot brake pedal by the operator of a motor vehicle.

The invention aims to provide an electric automobile horn sounding device in which use is made of the inertia of a suitable object as opposed to the quick initial brake pedal movement of a motor vehicle to close an electric horn circuit which will remain closed until the brake pedal returns to its full normal position, at which time the circuit is automatically opened. Such a device will be found useful in audibly signalling to pedestrians, animals and drivers of other vehicles whereby the operator may have free use of both hands to turn the steering wheel or be prepared to do so, to signal or assist in slowing up or stopping in order to avoid a collision, thus eliminating the necessity of reaching for the horn button to give an audible signal. When used upon a vehicle equipped with the conventional stop light, the driver of a vehicle in the rear is given an audible signal as well as the visual light signal that the vehicle ahead is about to suddenly stop or slow down its speed. Also the driver of a vehicle ahead on hearing the horn sound and seeing an approaching vehicle by gazing into the rear view mirror will be warned that the operator following is making an emergency stop, and the said operator would therefore endeavor to avoid a rear end collision by speeding up his vehicle. However, the normal operation of the foot pedal does not effect operation of the horn sounding device as the inertia response of such movement is insufficient to actuate the same.

Another feature of the invention is to afford the driver of a motor vehicle a greater ease of mind and pleasure by knowing that the foot actuated horn sounder is available and may be used when the occasion requires. Furthermore, it will prove of assistance by enabling a more effectual operation of the brakes when no turning movement of the steering wheel is necessary, by allowing the operator to brace himself with both hands on the wheel.

Another feature of the invention resides in an electric circuit closing device for accomplishing the above features which is simple in design, may be easily installed upon the brake pedal and wired in the electric horn circuit so as to require but a minimum amount of labor and expense in installation upon motor vehicles now in use; and which is free of any moving parts except during actuation.

With these and other objects in view, the invention resides in the certain novel construction, combination and arrangement of parts, the essential features of which are hereinafter fully described, are particularly pointed out in the appended claims, and are illustrated in the accompanying drawing, in which:

Figure 1 is a sectional elevational view showing the invention in use upon a motor vehicle.

Figure 2 is a transverse sectional view on the line 2—2 of Figure 1.

Figure 3 is a vertical sectional view on the line 3—3 of Figure 2.

Figure 4 is a top plan view of the horn sounder per se.

Figure 5 is a detail vertical sectional view on the line 5—5 of Figure 4.

Figure 6 is a horizontal sectional view on the line 6—6 of Figure 3.

Referring to the drawing by reference characters, the numeral 10 designates a fragmentary portion of a motor vehicle which includes a foot actuated spring return brake pedal 11, the shank portion 12 of the pedal underlying the foot board 13 of the motor vehicle, whereas the pedal end of the brake pedal extends through an opening in the foot board 13.

My emergency automobile horn sounder constitutes an inertia operated electric switch and comprises a substantially T-shaped attaching plate 14, while fixedly secured to the shank portion of the plate 14 is a cylindrical casing 15, the same being open at opposite ends. The bottom end of the casing 15 is internally screw threaded as at 16 for threadedly receiving a headed screw plug 17, the periphery of the head of the plug being provided with an annular series of teeth 18 while secured to the inner end of the plug is a rubber cushion pad 19.

Seated upon the top end of the casing 15 is a disk or partition 25 of di-electric material and resting thereon is a hooded cap 20, while mounted on the closed end of the cap is a T-shaped fitting 21, the shank portion of the T-shaped fitting extending laterally and being closed by a removable screw plug 22. The cap 20 is secured in position by upstanding fingers 15a which are integral with the casing 15 and have their free ends bent over the top of the cap 20 as best seen in Figures 4 and 5. Slidably supported by the cross head portion of the T-shaped fitting 21 is a rod 23, the outer end of the rod being provided with a head 24, while the inner end of the rod freely slides through the cross partition or disk 25 into the casing 15 axially thereof. The inner free end of the rod 23 is provided with a head 26 while loosely contained within the casing between the head 26 and the plug 17 is an inertia operated member in the form of a metal ball 27. When the rod 23 is at the limit of its inward movement, sufficient space exists between the normal position of the ball 27 and the head 26 as to permit movement of the ball lengthwise of the casing for a purpose to be presently explained, but this space may be varied by the adjustment of the said plug 17 to give greater or less force to the ball 27.

For the purpose of tensioning the sliding movement of the rod 23 there is provided a rod tensioning means which includes a metal ball 28 freely mounted in the T-fitting 21, and which is held against the rod 23 by a spring 29', the said spring being interposed between the ball 28 and the plug 22. Sufficient tension is exerted by the spring 29' upon the ball 28 to press the ball against the rod 23 and hold the same against free sliding movement. The tension upon the rod may be varied by the adjustment of the screw plug 22, and in some instances it may be desired to entirely relieve the tension by further unscrewing of the plug. There is a certain tension at all times between the rod and the bearing parts in which it slides and which is sufficient when the device is used upon sluggish brake pedals.

Supported by the disk 25 and rising upwardly within the cap 20 are resilient spring contacts 29 and 30, respectively, the same being disposed on opposite sides of the rod 23 and which have their opposed intermediate portions bent outwardly and thence inwardly as at 29ª and 30ª respectively, while the free ends extend in upwardly and outwardly diverging relation. The contact 30 connects with a terminal 32 which is grounded through a bracket 33 to the casing 15. The contact 29 is connected to a terminal 34 to which one end of a wire 35 connects, the said wire leading through a short length of metal flexible tubing 35ª which extends around the brake pedal shaft to protect the same against wear. The wire 35 leads to one terminal of an electric horn 37, while the other terminal of the horn is joined by a wire 36 leading from a battery (not shown).

Fixedly secured to the rod 23 is a collar 38 of di-electric material, which fitting against the under side of the collar and secured to the rod 23 but insulated therefrom is a metal ring contact 39 which when moved into engagement with the free end of the contacts 29 and 30, constitutes a bridging contact for closing the circuit in which the horn 37 is arranged. For the sake of assembly, the rod 23 is constructed of two threadedly connected sections with the collar 38 and the ring contact 39 located at the joint therebetween.

By screwing the plug 17 inwardly and outwardly, the distance between the inner head end of the rod 23 and the normal position of the ball 27 may be varied and for holding the plug 17 against accidental turning, a spring tooth catch 40 is fixed to the lower end of the casing 15 and the free tooth end thereof releasably engages the teeth 18 on the head of the plug 17.

By reference to Figure 1 of the drawing, it will be noted that the emergency horn sounder is fixedly secured to the shank portion 12 of the brake pedal 11, the cross head portion of the attaching plate 14 lying parallel to and flat against the outer side of the shank and that clamps 41 pass about the shank of the brake pedal and the arms of the attaching plate 14. One of the clamps 41 is provided with a guide eye 41ª for the passage of the wire 35, while fixed to the pedal shank 12 below the sounder device is a clamp 41ᵇ for holding the wire at this point. When in this position, the casing 15 of the sounder device extends downwardly from the shank of the brake pedal at right angle thereto with the ball 27 resting upon the plug 17 due to gravity while the outer head 24 of the rod 23 abuts the under side of the foot board 13.

In practice, upon a normal operation of the brake pedal 11, the brake of the motor vehicle is effectively applied, but such operation is not sufficient to produce the necessary force to cause the ball 27 to forcibly strike the head 26 of the rod 23, and thus the sounding device remains inoperative. In the event that the brake pedal 11 should be quickly depressed for a relatively short distance, retarding of the speed of the vehicle being desired, or quickly depressed to the limit of its travel for suddenly stopping the vehicle, the metal ball 27, due to its inertia, strikes the head 26, forcing the rod 23 outwardly of the casing, whereupon collar 38 moves clear of the contacts 29 and 30 and strikes the top of the cap while the metal ring 39 engages and bridges the resilient fixed contacts 29 and 30, as shown in dotted lines in Figure 3 of the drawing, thus closing the horn circuit and causing the sounding of an audible signal. When the switch is moved to the "on" position just described, the inwardly extending portions 29ª and 30ª of the resilient fixed contacts engage beneath the di-electric collar 38 with the outwardly diverging ends of the same engaging the metal ring 39, whereby the rod is held against accidental inward sliding movement and the switch held closed. However, upon the full return of the brake pedal 11, the outer head 24 of the rod 23 strikes against the under side of the foot board 13, and this action causes the rod 23 to move inwardly to the position shown in full lines in Figure 3, breaking the electric circuit through the contacts 29 and 30. It might here be stated that normally, the inwardly extending portions 29ª and 30ª of the contacts 29 and 30 abut the top edge of the collar 38 at opposite sides thereof. Also, that the collar 38 striking the inside of the top of the cap 20 limits the outward movement of the rod 23 to cause the contact ring 39 to stop on a plane with the resilient free contacting portions of the contacts 29 and 30, whereas the head 24 striking the fitting 21 limits inward movement of the rod 23.

In the event that the driver of the motor vehicle has made an emergency stop and then wishes to remain stationary, as on a hill, the foot brake pedal is released and immediately actuated in the usual manner, the car being held against accidental movement in the interim by actuation of the hand brake.

While I have shown and described what I deem to be the most practical embodiment of my invention, I wish it to be understood that such changes as come within the scope of the appended claims, may be resorted to if desired.

Having thus described the invention, what I claim as new and desire to secure by Letters Patent of the United States, is:

1. In combination with a motor vehicle having a foot operated brake pedal, an inertia operated electric switch mounted upon the shank of said brake pedal, said switch including a casing, a pair of spaced contacts within said casing, a rod slidably mounted in one end of said casing, an inertia operated member loosely mounted in said casing between the inner end of said rod and the adjacent end of said casing, a bridge contact carried by said rod and normally out of engagement with said spaced contacts, whereby the force produced only by the quick initial actuation of said brake pedal will cause said inertia operated member to forcibly strike the inner end of said rod and move said bridge contact into contacting engagement with said pair of fixed contacts, and tension means acting upon said rod to regulate the sliding movement thereof.

2. In combination with a motor vehicle having a foot operated brake pedal, an inertia operated electric switch mounted upon the shank of said brake pedal, said switch including a casing, a pair of spaced contacts within said casing, a rod slidably mounted in one end of said casing, means acting upon said rod to regulate the sliding movement thereof, an inertia operated member loosely mounted in said casing between the inner end of said rod and the adjacent end of said casing, a bridge contact carried by said rod and normally out of engagement with said spaced contacts, whereby the force produced only by the quick initial actuation of said brake pedal will cause said inertia operated member to forcibly strike the inner end of said rod and move said bridge contact into contacting engagement with said pair of fixed contacts, and means in the path of the outer end of said rod upon the return of said brake pedal to normal position for returning the same from an extended to a retracted position.

3. An inertia operated electric switch comprising a casing, a pair of fixed spaced contacts mounted in said casing, a rod slidably mounted in one end of said casing, a bridge contact mounted on said rod and normally out of engagement with said fixed contacts, means for limiting the inward and outward sliding movement of said rod, and an inertia operated member loosely arranged in said casing between the inner end of said rod and the adjacent end of said casing for imparting a striking blow to the inner end of said rod to move the bridge contact into engagement with said fixed contacts, and means engaging said rod to regulate the sliding movement thereof.

4. An inertia operated electric switch comprising a casing, a pair of fixed spaced contacts mounted in said casing, a rod slidably mounted in one end of said casing, a threaded plug closing the other end of said casing, a bridge contact mounted on said rod and normally out of engagement with said fixed contacts, means for limiting the inward and outward sliding movement of said rod, an inertia operated member loosely arranged in said casing between the inner end of said rod and said plug for imparting a striking blow to the inner end of said rod to move the bridge contacts into engagement with said fixed contacts, and tension means acting upon said rod to regulate the sliding movement thereof.

5. In combination with a motor vehicle having a foot board and a pivoted foot operated spring return brake pedal extending through said foot board, an inertia operated electric switch mounted upon the shank of said brake pedal beneath said foot board, said switch including an elongated casing, a pair of spaced contacts within said casing, a rod slidably mounted in one end of said casing and having its outer end engageable with said foot board upon the upward return movement of the brake pedal, tension means acting upon said rod to regulate the sliding movement thereof, an inertia operated member loosely arranged in said casing between the inner end of said rod and the adjacent end of said casing, a bridge contact carried by said rod and normally out of engagement with said spaced contacts, whereby the force produced by the quick initial actuation of said brake pedal will cause said inertia operated member to forcibly strike the inner end of said rod to overcome the action of said tension means and move said bridge contact into contacting engagement with said pair of spaced contacts, the outer end of said rod striking the under side of said foot board upon the spring return movement of said brake pedal to push said rod inwardly to move said bridge contact out of engagement with said pair of spaced contacts.

6. An inertia operated electric switch comprising a cylindrical casing, a pair of fixed opposed contacts mounted in said casing adjacent the top end thereof, a rod slidably mounted in the top end of said casing, a bridge contact mounted on that portion of said rod disposed within said casing and normally disposed inwardly of the plane of said fixed contacts, means for limiting the inward and outward sliding movement of said rod, tension means acting upon said rod to regulate the sliding movement thereof, and an inertia responsive member loosely arranged within said casing between the inner end of said rod and the bottom of said casing for imparting a striking blow to the inner end of said rod to slide the same upwardly against the action of said tension means to cause said bridge contact to engage said fixed contacts.

7. An inertia operated electric switch comprising a cylindrical casing, a pair of fixed opposed contacts mounted in said casing adjacent the top end thereof, a rod slidably mounted in the top end of said casing, a bridge contact mounted on that portion of said rod disposed within said casing and normally disposed inwardly of the plane of said fixed contacts, means for limiting the inward and outward sliding movement of said rod, tension means acting upon said rod to regulate the sliding movement thereof, said tension means including a ball frictionally engaging the side of said rod, and a spring acting to urge said ball against said rod, and an inertia responsive member loosely arranged within said casing between the inner end of said rod and the bottom of said casing for imparting a striking blow to the inner end of said rod to slide the same upwardly against the action of said tension means to cause said bridge contact to engage said fixed contacts.

MARTIN M. COLLINS.